Dec. 17, 1963
A. EISELE
3,114,207
DUAL BORE ALIGNMENT AND CONCENTRICITY GAUGE
Filed June 10, 1960
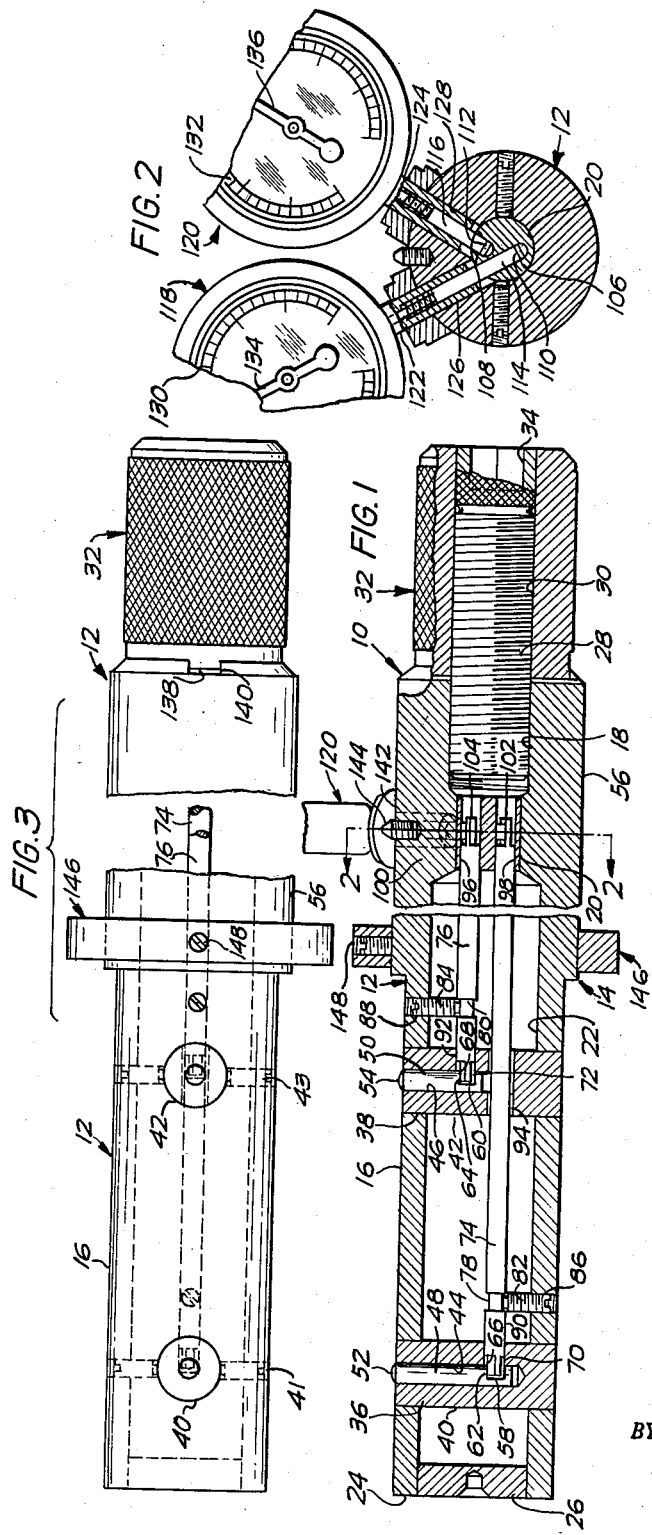
INVENTOR.
ANDREW EISELE
BY
Barthel & Bugbee
ATTORNEYS United States Patent Office 3,114,207
Patented Dec. 17, 1963

3,114,207
DUAL BORE ALIGNMENT AND CONCENTRICITY GAUGE
Andrew Eisele, 459 Beldon Road, Garden City, Mich.
Filed June 10, 1960, Ser. No. 35,349
7 Claims. (Cl. 33—174)

This invention relates to gauges and, in particular, to bore gauges.

Hitherto, the checking of two bores for alignment or concentricity relatively to a third bore has been difficult because an ordinary plug gauge will not enter the bores to be checked if they are out of alignment with the reference bore. The use of an ordinary bore concentricity gauge, moreover, gives only successive readings and not simultaneous comparisons of the state of the bores as regards concentricity or alignment and roundness. The present invention enables a simultaneous and quantitative comparison of these factors to be made in a rapid and precise manner.

Accordingly, one object of this invention is to provide a bore alignment and concentricity gauge which enables the accuracy of alignment or concentricity of two bores to be checked relatively to a third bore which serves as a master or reference bore engaging a pilot portion of the gauge.

Another object is to provide a bore alignment and concentricity gauge of the foregoing character which is equipped with two dial indicators registering the transverse motions of two measuring pins through motion-transmitting rods in such a manner that the deviations of alignment or concentricity of the two bores relatively to the third or reference bore can be individually measured simultaneously.

Another object is to provide a bore alignment and concentricity gauge of the foregoing character which also indicates the amount and extent of any out-of-roundness existing in either of the bores being checked.

Other objects and advantages of the invention will become apparent during the course of the following description of the accompanying drawing, wherein:

FIGURE 1 is a central vertical section through a bore alignment and concentricity gauge according to one form of the invention, taken in the plane of the axes of the measuring pins with the measuring pin in vertical position;

FIGURE 2 is a cross-section taken along the line 2—2 in FIGURE 1, with portions of the dial indicators omitted to conserve space; and FIGURE 3 is a top plan view of the gauge shown in FIGURE 1, with the central portion containing the dial indicators broken away to show the underlying motion-transmitting rod leading from the measuring pins to the dial indicators.

Referring to the drawing in detail, FIGURES 1 and 3 show a bore alignment and concentricity gauge, generally designated 10, according to one form of the invention as consisting generally of an elongated hollow support, casing or barrel 12 having a precisely-machined pilot or rearward portion 14 and a forward or nose portion 16 located foward of the pilot portion 14 and of slightly smaller diameter. The casing 12 is roughly tubular or hollow in that its pilot or rearward portion contains a threaded central bore 18 which communicates at its inner end with a slightly smaller diameter bore 20 leading to a larger diameter bore 22 extending therefrom to the forward end 24 of the casing or barrel 12. The bore 22 at the forward end 24 is closed by a plug 26.

A threaded coupling screw 28 of the headless so-called Allen screw type is threaded into the bore 18 at its forward end and into a correspondingly threaded bore 30 of a generally cylindrical knurled handle 32. The coupling screw 28 at its outer end has a wrench socket 34 of hexagonal or other suitable cross-section for the reception of a conventional wrench (not shown) by which the screw 28 may be threaded into or out of the bores 18 and 30.

The forward or nose portion 16 of the barrel or casing 12 is provided with a pair of transverse bores 36 and 38 respectively disposed with their axes in a common plane and containing cylindrical bodies 40 and 42 respectively. The latter are held in place by diametrically-opposite set screws 41 and 43 (FIGURE 3) and contain central bores or sockets 44 and 46 respectively coaxial with the bores 36 and 38 and bodies 40 and 42. Reciprocably mounted in the bores 44 and 46 are forward and rearward measuring pins 48 and 50 having rounded outer ends 52 and 54 respectively adapted to engage the two supposedly concentric coaxial bores which are to be checked according to a reference bore snugly receiving the precisely machined cylindrical outer surface 56 of the pilot portion 14 of the barrel or casing 12. The measuring pins 48 and 50 near their inner ends contain notches 58 and 60 respectively having accurately machined flat contact surfaces 62 and 64 engageable with sharp edges 66 and 68 on the flattened forward ends 70 and 72 of forward and rearward rotary motion-transmitting rods 74 and 76 respectively.

The rotary motion-transmitting rods 74 and 76 are grooved at 78 and 80 for engagement by the inner ends of headless set screws 82 and 84 threaded through transverse threaded bores 86 and 88 in the barrel or casing 12. The screws 82 and 84 thus prevent longitudinal motion of the motion-transmitting rods 74 and 76, which are rotatably supported near their forward ends 70 and 72 in bearing bores 90 and 92 disposed transverse to the bores 44 and 46 in the cylindrical bodies 40 and 42. The forward motion-transmitting rod 74 passes loosely through an enlarged bore 94 in the cylindrical body 42 spaced apart from the bore 92 and providing adequate clearance for free rotation of the rod 74.

The rearward end portions of the motion-transmitting rods 74 and 76 are rotatably mounted in parallel-axis bearing bores 96 and 98 in a bearing bushing 100 snugly fitting the bore 20, and have flattened inner ends 102 and 104 which, like the flattened forward ends 70 and 72, have sharp contact edges 106 and 108 (FIGURE 2). The bearing bushing 100 is laterally apertured to enable the flat ends 110 and 112 of the plungers 114 and 116 of forward and rearward dial indicators, generally designated 118 and 120 respectively, to engage the sharp edges 106 and 108 respectively. The dial indicators 118 and 120 are conventional and have hollow stems 122 and 124 bored to receive and reciprocably guide the spring-pressed dial indicator operating plungers 114 and 116 and to fit sockets 126 and 128 respectively in the rearward portion of the barrel 12. The axes of the bores 126 and 128 are disposed in approximately the same transverse plane in circumferentially-spaced relationship at a convenient angle relatively to one another, for example 60 degrees, in order that the dial indicator plunger 114 will clear the flattened end 104 of the upper motion-transmitting rod 76.

The handle 32 has a diametral tongue 138 (FIGURE 3) fitting a diametral notch or groove 140 to prevent relative rotation between the handle 32 and the barrel or casing 12. A stop collar 146 is slidably mounted on the surface 56 of the pilot portion 14 for adjustment thereon to regulate the depth to which the barrel forward portion 16 may be inserted into the workpiece bores to be checked, and is secured in position by any suitable means, such as by a set screw 148. A threaded socket 142 is formed in the rearward end portion of the barrel 12 with its axis disposed in the same plane as the axes of the measuring pin bores 44 and 46 (FIGURE 3) so as to receive a threaded pointer 144 with a tapered upper end which indicates to the operator the positions of the measuring pins 52 and 54 when these are hidden within the bores being checked for alignment or concentricity.

In the operation of the invention, let it be assumed that the workpiece having two intendedly coaxial bores to be measured for alignment or concentricity is precisely bolted or otherwise secured accurately in a measuring fixture (not shown) which has a precisely machined reference or master bore, the axis of which would be coaxial with the two workpiece bores being checked if the two workpiece bores were accurately coaxial with each other and with the reference bore. The forward end 24 of the casing 12 is pushed through the reference bore in the fixture and thence through the first or outer workpiece bore into the second or inner workpiece bore until the measuring pins 48 and 50 enter their respective inner and outer workpiece bore and the outer surface 56 of the pilot portion 14 is snugly seated in the reference bore of the fixture. The workpiece bores may be and usually are of different diameters or they may be different portions of a bore of the same diameter.

As the measuring pins 48 and 50 enter their respective inner and outer workpiece bores, their rounded ends 52 and 54 engage the bore walls or surfaces and are pushed inwardly thereby. The inward motion of the transverse measuring pins 48 and 50 causes their notch wall surfaces 62 and 64 to engage the sharp edges 66 and 68 of the flattened portions 70 and 72 of the motion-transmitting rods 74 and 76, rocking the forward flattened portions 70 and 72 so as to rotate the motion-transmitting rods 74 and 76 in a clockwise direction, looking from the rear toward the front as in FIGURE 2. The consequent rocking of the rearward flattened portions 102 and 104 causes their sharp edges 106 and 108 to push upward against the flat ends 110 and 112 of the dial indicator plungers 114 and 116 with a motion which is transmitted through the mechanisms of the dial indicators 118 and 120 to the needles or pointers 134 and 136, swinging the latter. The pointers 134 and 136 come to rest against the dial graduations 130 and 132 in positions corresponding to the positions of the measuring pin ends 52 and 54 against the walls or surfaces of the inner and outer workpiece bores being checked.

The operator, by means of the knurled handle 32, now rotates the gauge 10 or moves it to and fro so that the ends 52 and 54 of the measuring pins 48 and 50 trace out arcuate portions of the workpiece bores being measured. If these are accurately in alignment or coaxial with the reference bore in the measuring fixture engaged by the pilot portion 14, the needles 134 and 136 of the dial indicators 118 and 120 remain stationary relatively to their respective dial graduations 130 and 132. If, on the other hand, the workpiece holes have been bored off-center, or either is out of round, or either is drilled with its axis at an angle to the true and intended axis, namely, the axis of the reference bore, either or both of the dial indicator needles 134 and 136 move relatively to their dial graduations 130 and 132. The extent of motion of the needles 134 and 136 relatively to their respective dial graduations 130 and 132 as the gauge 10 is rotated is a measure of the lack of concentricity or eccentricity of the workpiece bores, their misalignment or their out-of-roundness.

It will be evident that by pushing the bore gauge 10 inward or outward relatively to the workpiece bores being checked, the operator can check different zones of the bores for alignment, concentricity or out-of-roundness. While the operator is turning the barrel 12 of the gauge 10 in the workpiece bore, the pointer 144 shows him the exact position occupied by the ends 52 and 54 of the measuring pins 48 and 50 whose axes are disposed in the same plane as the axis of the pointer 144.

What I claim is:

1. A dual bore alignment and concentricity gauge for checking the alignment and concentricity of first and second workpiece bores relatively to a third reference bore in a measuring fixture, said gauge comprising an elongated hollow support having a forward portion adapted to enter the workpiece bores and a precisely-machined rearward portion having a longitudinally-extending external pilot surface with a configuration which is the accurate counterpart of the reference bore and which is adapted to accurately fit the reference bore, said forward portion having therein forward and rearward transverse bores spaced longitudinally apart from one another in parallel axis relationship; forward and rearward measuring elements reciprocably mounted in said forward and rearward transverse bores and having external bore-engaging contact portions, forward and rearward dial indicators mounted on the rearward portion of said hollow support and having movable operating members extending into the interior thereof, and forward and rearward motion-transmitting mechanisms operatively connecting said forward and rearward measuring elements to said forward and rearward dial indicators respectively, said forward and rearward motion-transmitting mechanisms being freely movable in opposite directions in response to the motions of said forward and rearward measuring elements in opposite direction consequent upon the sliding engagement of said measuring elements relatively to said first and second workpiece bores for shifting said dial indicator operating members in opposite directions to actuate said dial indicators in concentricity-indicating action.

2. A dual bore alignment and concentricity gauge, according to claim 1, wherein said measuring elements are freely movable in opposite directions from their sliding engagement with said bores and have internal motion-transmitting contact portions thereon and wherein said motion-transmitting mechanisms are operatively engaged by said internal contact portions.

3. A dual bore alignment and concentricity gauge, according to claim 1, wherein said motion-transmitting mechanisms include elongated motion-transmitting rods disposed longitudinally within said support with the axes of said rods disposed in laterally-spaced parallel relationship and freely movable back and forth therein.

4. A dual bore alignment and concentricity gauge, according to claim 2, wherein said motion-transmitting mechanisms include elongated motion-transmitting rods having their forward end portions operatively engaged by said internal contact portions and their rearward end portions operatively engaging said dial indicator operating members.

5. A dual bore alignment and concentricity gauge, according to claim 1, wherein the axes of said measuring elements are disposed in a single longitudinal plane and wherein the rearward portion of said support has a bore-position locating element thereon also disposed in said longitudinal plane.

6. A dual bore alignment and concentricity gauge, according to claim 4, wherein said rearward end portions of said motion-transmitting rods are disposed in approximately the same transverse plane in said support and wherein the axes of said operating members of said dial indicators are also disposed in substantially the same transverse plane in said support.

7. A dual bore alignment and concentricity gauge, according to claim 6, wherein the axes of said operating members of said dial indicators are also disposed in circumferentially-spaced relationship relatively to one another in said substantially same transverse plane in said support and rendering said dial indicators simultaneously visible to the operator.

References Cited in the file of this patent
UNITED STATES PATENTS

| | | |
|---|---|---|
| 2,788,582 | Middeler | Apr. 16, 1957 |
| 2,831,258 | Eisele | Apr. 22, 1958 |